US006682836B2

(12) United States Patent
Rüegge et al.

(10) Patent No.: US 6,682,836 B2
(45) Date of Patent: Jan. 27, 2004

(54) METHOD FOR THE OPERATION OF A FUEL CELL BATTERY COMPRISING A CONTROL SYSTEM

(75) Inventors: Andreas Rüegge, Wintethur (CH); Thomas Gamper, Trasadingen (CH); Philip Holoch, Winterthur (CH)

(73) Assignee: Sulzer Hexis AG, Winterthur (CH)

( * ) Notice: Subject to any disclaimer, the term of this patent is extended or adjusted under 35 U.S.C. 154(b) by 251 days.

(21) Appl. No.: 10/001,068

(22) Filed: Oct. 24, 2001

(65) Prior Publication Data

US 2002/0055023 A1 May 9, 2002

(30) Foreign Application Priority Data

Nov. 7, 2000 (EP) ............................................. 00811042

(51) Int. Cl.⁷ ............................................ H01M 08/00
(52) U.S. Cl. ....................................................... 429/13
(58) Field of Search ............................. 429/13, 24, 25, 429/23, 30, 34, 17

(56) References Cited

U.S. PATENT DOCUMENTS 5,840,437 A * 11/1998 Diethelm .................... 429/14
6,136,462 A   10/2000 Kriechbaum et al.

FOREIGN PATENT DOCUMENTS

| DE | 4037970 A1 | 6/1991 |
| EP | 0377151 A1 | 7/1990 |
| EP | 0780917 A1 | 6/1997 |
| EP | 0818840 A1 | 1/1998 |

* cited by examiner

*Primary Examiner*—Carol Chaney
*Assistant Examiner*—Angela J. Martin
(74) *Attorney, Agent, or Firm*—Townsend and Townsend and Crew, LLP

(57) ABSTRACT

The method for the operation of fuel cell battery (10) comprises a control system (14), through which the electrochemical reactions in cells (11) of the battery are influenced. Gaseous flows (1, 2) of two educts (A, B) are fed into the battery in a controlled manner in a conditionally predetermined ratio of quantities and are passed through the cells separately. The first educt (A) contains oxidizing components, the second educt (B) contains reducing components and the first educt is in particular ambient air. The educt flows (1, 2) are united after passage through the cells and are further treated by means of an afterburning process and with the production of a flow (3) of exhaust gas (C), so that at the conditionally predetermined ratio of quantities the reducing components are completely oxidized. The first educt flow, in particular the air flow, is variable through the control system to a limited extent; it is used for a regulation of the reaction temperature. Simultaneously to the regulation of the reaction temperature the second educt flow is held constant, namely by means of a second regulation (5, 6; 18, 19) which acts on one of the educt flows upstream of the battery inlet (13a, 13b).

10 Claims, 3 Drawing Sheets

METHOD FOR THE OPERATION OF A FUEL CELL BATTERY COMPRISING A CONTROL SYSTEM

Figure 1:
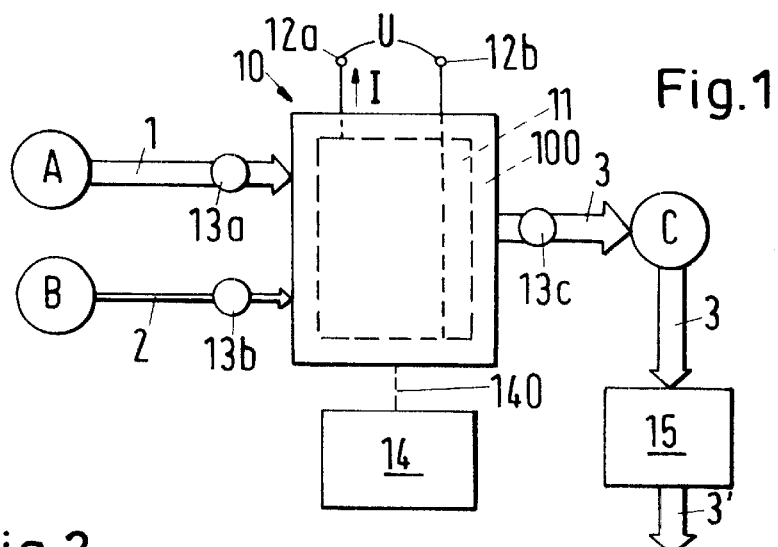

The invention relates to a method for the operation of a fuel cell battery comprising a control system. It also relates to a plant with a fuel cell battery, the operation of which is controlled in accordance with the method in accordance with the invention.

Fuel cells, in particular high temperature fuel cells of the SOFC type ("Solid Oxide Fuel Cell"), enable a utilization of energy of a fuel through an energy conversion. In this, both electrical energy, which is produced as a result of electrochemical processes, and thermal energy, which arises in the form of hot exhaust gases, can be used. Gaseous flows of two educts are passed through the cells separately. The first educt, which is in particular ambient air, contains oxidizing components, the second educt contains reducing components. A gas containing methane (e.g. natural gas) is advantageously used as the second educt, and is passed prior to entry into the cells through a reformer and is for example converted there into the reducing components hydrogen and carbon monoxide by means of an additional infeed of water and with process heat being supplied. The hot exhaust gas can advantageously be used as the source for the process heat which is required in the reformer. In the following description no distinction will be made between the flows of an original educt and those of a converted educt.

The reforming processes will as a rule no longer be explicitly named; rather it will be tacitly assumed that the use of reformers is also provided for.

The educts are fed into the battery in a controlled manner, and indeed in a conditionally predetermined ratio of quantities, for which a safety condition must be fulfilled: No reducing components, that is, no unburned components of the second educt, may any longer be contained in the exhaust gas flow. Thus a gas safety system must be provided, by means of which a situation is achieved in which $\lambda \geq 1$ for the air index (or air ratio) $\lambda$ which is related to the stoichiometric relationship. In fan driven burners, pneumatic mixing devices are used which enable a variable supply of the educt flows into a combustion chamber with $\lambda$ remaining constant. Such devices operate with a balanced pressure regulator or a pressure ratio regulator. During the development of the control system for plants with fuel cells, the idea arose of using the mixing apparatuses which are known from fan driven burners in a suitably modified form in the control system to be developed.

The electrical energy requirement of the consumer is not constant as a rule, so that the load which is placed on the fuel cell battery correspondingly has a fluctuating variation. Load variations of this kind result in temperature fluctuations in the cell. The reaction temperature must be kept by means of a regulation to within an interval in which the temperature is sufficiently high for efficient processes and is sufficiently low with respect to the materials used.

The educt flows are advantageously driven by sucking away the exhaust gas by means of a fan of which the speed of rotation is controlled. The reaction temperature can be regulated by means of variations of the speed of rotation of the blower. If the named pneumatic device is to be used, then a problem arises which is not known from the fan driven burners: If the consumer for example draws less electrical energy, then with the educt flows remaining unchanged the production of waste heat increases correspondingly. If now the air flow—the flow of the first educt—is intensified in order to be able to remove surplus heat from the cells to an increased extent, then the supply of the second educt also increases. This would however result in an intensified turnover of the electrochemical reaction in contradiction to the reduced demand for electrical energy.

The object of the invention is to create a method by means of which the said pneumatic device with pressure regulator can be used—suitably modified—in a plant with a fuel cell battery and in which a temperature regulation with variable flow of the first educt (as a rule, ambient air) is possible. This object is satisfied by the method which is defined in claim 1.

The method for the operation of a fuel cell battery comprises a control system, through which the electrochemical reactions in cells of the battery are influenced. Gaseous flows of two educts are fed into the battery in a controlled manner in a conditionally predetermined ratio of quantities and are passed through the cells separately. The first educt contains oxidizing components, the second educt containing reducing components and the first educt is in particular ambient air. The educt flows are united after passage through the cells and are further treated by means of an afterburning process and with the production of a flow of exhaust gas, so that, at the conditionally predetermined ratio of quantities, the reducing components are completely oxidized. The first educt flow, in particular the air flow, can be varied by the control system to a limited extent; it is used for a regulation of the reaction temperature. Simultaneously to the regulation of the reaction temperature the second educt flow is held constant, namely by means of a second regulation, which acts on one of the educt flows upstream of the battery inlet.

The subordinate claims 2 to 9 relate to advantageous embodiments of the method in accordance with the invention. A plant with fuel cells which is operated in accordance with this method is the subject of claim 10.

The quality of the fuel can vary, so that fixed values for the proportions of the reducing components can not be assigned to the mass flow of the second educt in a unique way. The method in accordance with the invention can be further developed in such a manner that fluctuations in the fuel quality can also be taken into account. For this for example a $\lambda$-probe or a CO sensor is employed, which is used for measuring the residual proportion of oxygen or the residual carbon monoxide CO in the exhaust gas flow respectively. Changes of the remaining proportion of oxygen and/or of the remaining carbon monoxide CO can be considered as a measure for the changes of quality. The regulation of the second educt flow, as is provided in the method in accordance with the invention, can then be extended such that regulation is carried out to hold constant the residual proportion of oxygen in the exhaust gas flow.

The quality of the second educt can also be characterizable by another parameter, for example by the proportion of hydrogen. A sensor for measuring this characteristic parameter can be arranged in the second educt flow, so that a variation in the characteristic parameter can be used to influence of the second regulation process. With this, the carrying out of the second regulation is likewise possible as a result of a change of quality of the second educt.

Figure 2:
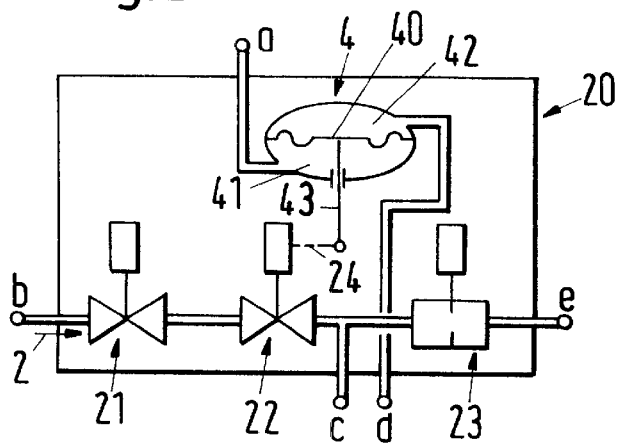
Figure 3:
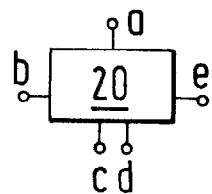
Figure 4:
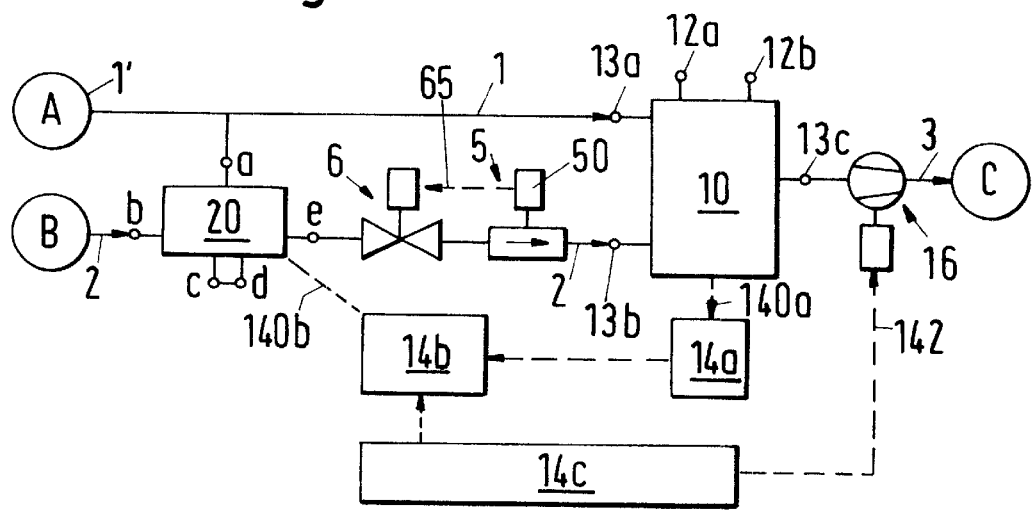
Figure 5:
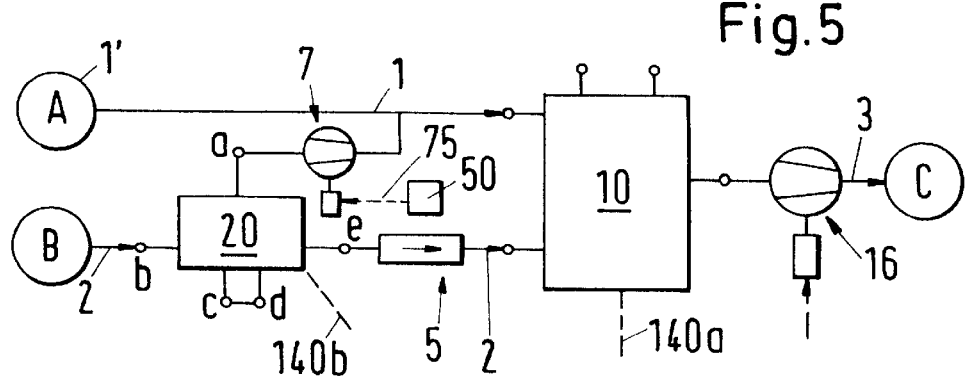
Figure 6:
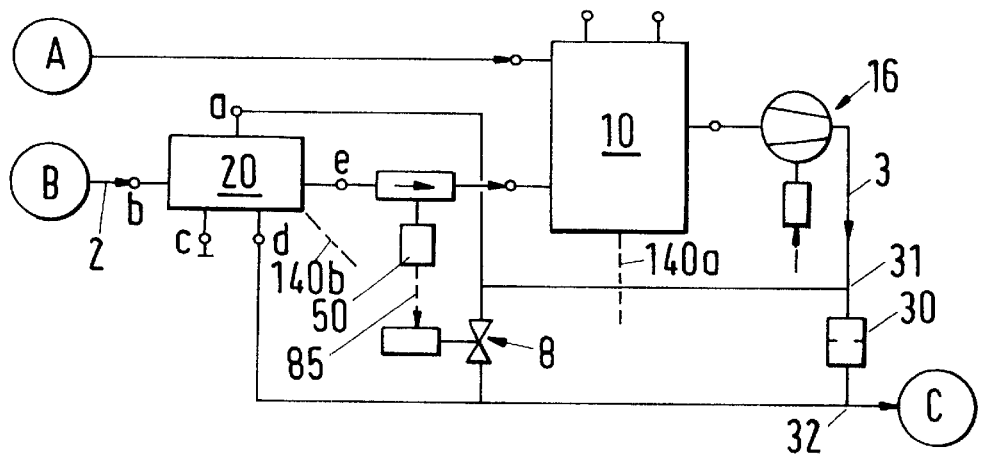
Figure 7:
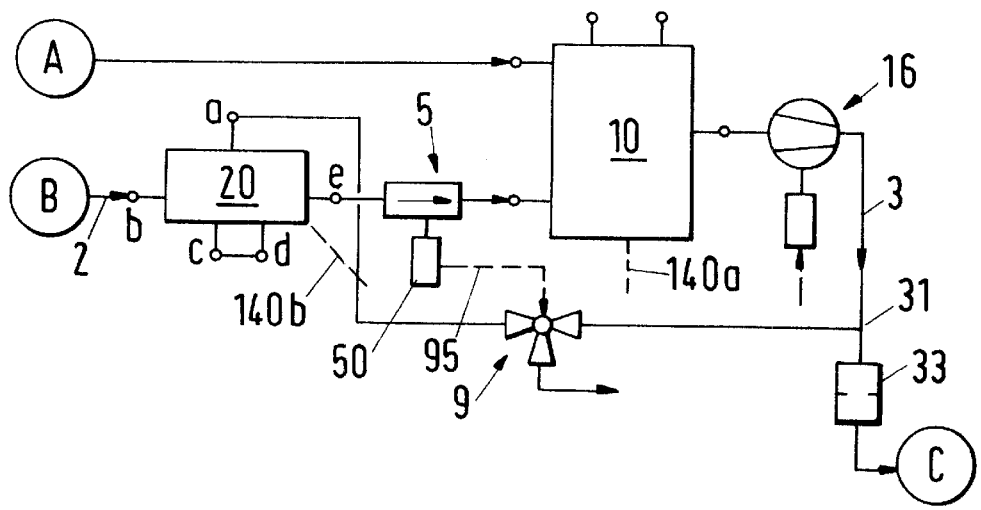
Figure 8:
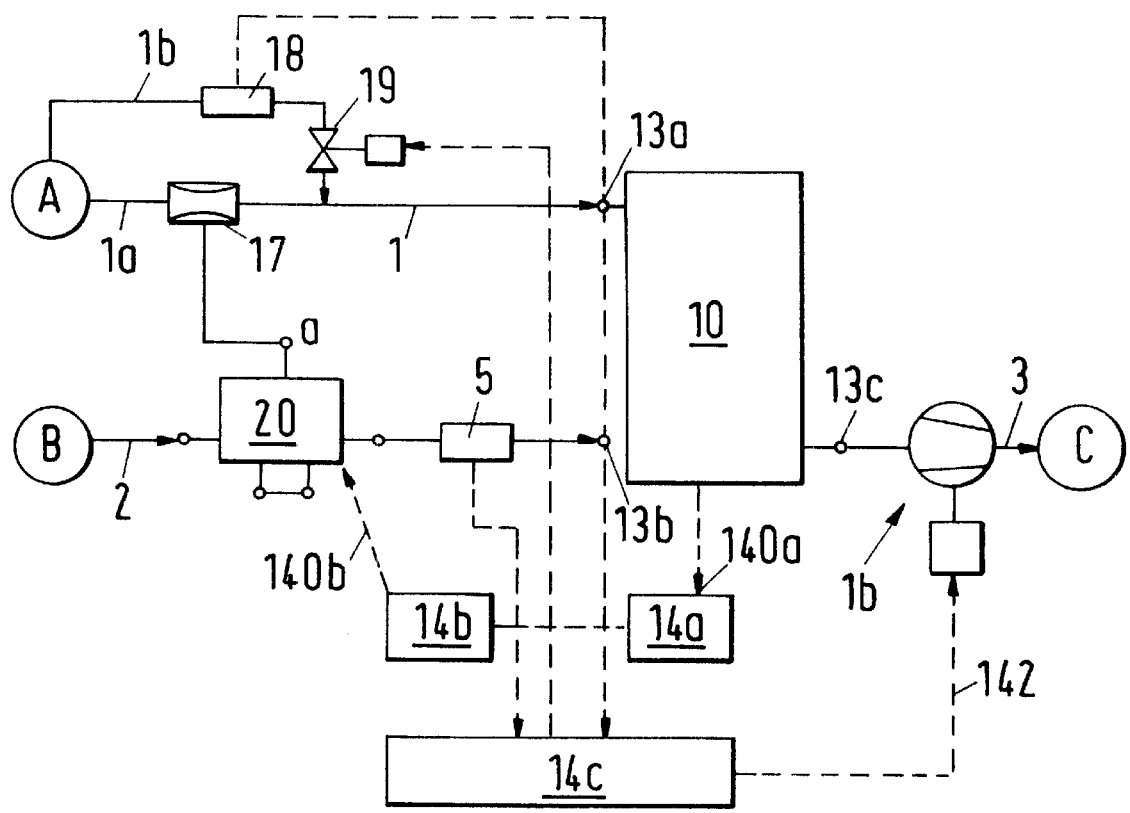

The invention will be explained in the following with reference to the drawings. Shown are:

FIG. 1 a schematic illustration of a plant with fuel cells in which the method in accordance with the invention is to be used, FIG. 2 a pneumatic device such as is already used for fan driven burners, FIG. 3 a symbolic illustration of the device of FIG. 2, FIG. 4 a block circuit diagram pertaining to a plant in which a first embodiment of the method in accordance with the invention is used, FIGS. 5–7 in each case a block circuit diagram pertaining to three further embodiments and FIG. 8 a block circuit diagram pertaining to an embodiment of the method in accordance with the invention in which the first educt flow is acted on by a setting member.

The schematic illustration of FIG. 1 shows a plant with a fuel cell battery 10 in which a stack of fuel cells 11 is arranged—surrounded by a heat insulating sleeve 100. Electrical energy which is generated within the cells 11 can be supplied via poles 12a and 12b to a non-illustrated consumer or load. The electrical current I and the voltage U which is present across the poles 12a and 12b depend on the number and the power output capability of the cells 11 and the load which is applied by the consumer. A fluid flow 1 with a gaseous educt A (as a rule, ambient air) is fed in via an inlet 13a into the battery 10. A second educt B, the fuel 2, enters via an inlet 13b, with this educt B as a rule first being converted in a non-illustrated reformer into a form which is capable of reacting. A waste heat which arises simultaneously with the electrical energy (=U×I) is transported away from the battery 10 in the form of a hot exhaust gas C through an outlet 13c as an exhaust gas flow 3 and is used by a consumer 15. Exhaust gas 3', which is cooled down by the consumer, is given off to the surroundings. The process which takes place within the battery 10 makes control systems necessary, which is carried out by means of a device 14, with this device 14 being connected to the battery 10 by information transmitting connections 140. In the embodiments described in the following (see FIG. 4) the device 14 is composed of a monitoring unit 14a, an automatic firing unit 14b and a control device 14c by means of which the entire plant is controlled and/or regulated.

The pneumatic device 20 (or an electro-pneumatic device) of FIG. 2 is part of a pneumatic mixture regulation, such as is already used for fan driven burners. The central element of this device 20 is a pressure regulator 4, here a balanced pressure regulator, in the form of a container which is subdivided by an elastically displaceable membrane 40 into two chambers 41 and 42. The membrane 40 is connected to a controllable valve 22 (connection 43, 24) in which a corresponding movement varying the through flow is produced as a result of the movement of the membrane 40. With respect to the changes of state of the valve 22 a distinction is made between a closing side and an opening side of the membrane 40: if the pressure on the opening side, namely in the chamber 41, is raised or lowered, then the valve 22 opens or closes respectively; a corresponding statement—only in reverse—holds for the closing side of the chamber 42. The opening side can be controlled via the connection a and the turning side via the connection d. The gas flow 2 to be controlled is fed in at an inlet b; it leaves the device 20 through an outlet e. The gas flow 2 can be stopped by means of a closing member 21. (In commercially available devices 20 two closing members 21 are connected one after the other.) A possibly required closing signal is given off through the automat firing unit 14b (FIG. 4) via a connection line 140b. In the mixture regulation of fan driven burners a second connector c is connected to the gas flow 2 with the connector d. Via the connector a, a gas pressure can act on the opening side, chamber 41, of the pressure regulator 4. A settable aperture diaphragm 23 is arranged downstream of the valve 22. With it the ratio of the two gas flows 1 and 2 can be changed and when required readjusted.

Instead of a balanced pressure regulator 4, a pressure ratio regulator with a constant pressure ratio can also be used. The ratio between the pressure $p_A$ of the educt A and the pressure $p_B$ of the educt B is for example 2:1 or 3:1. In the working range of the pressure regulator (for example 0.4 mbar<$p_B$<30 mbar/0.4 mbar<$p_A$<10 mbar) the pressure ratio $p_B$:$p_A$ is independent of $p_A$. In a balanced pressure regulator, $p_B$=$p_A$.

FIG. 3 shows a symbolic illustration of the device 20 of FIG. 2: Connection points a and d of the pressure regulator 4; inlet b and outlet e for the gas flow 2 of the educt B; side connection c of the gas flow 2 downstream of the regulated valve 22.

The block circuit diagram shown in FIG. 4 represents a plant in which a first embodiment of the method in accordance with the invention is used. The symbol 1' represents a reservoir of the educt A (reservoir pressure $p_A$), which is ambient air here as well as in the following exemplary embodiments. The pneumatic device 20 is connected up to the gas flows 1 and 2 as in known fan driven burners: (i.e. the same pressure at c and d). The connection point a is in direct connection with the reservoir 1' of the educt A; therefore the pressure which acts on the opening side of the pressure regulator 4 is substantially the same as the ambient pressure. With a fan 16 of which the speed of rotation is regulated, and which is arranged downstream of the battery 10, a depression in the cells 11 results (suction operation). The greater the forwarding power of the blower 16 is, the lower is the pressure (=$p_B$) which acts at the inlet d on the closing side of the pressure regulator 4 and the lower is thus the mass flow 2 of the educt B.

With a further member, namely a proportional action valve 6, and a mass flow sensor 5 the second gas flow 2 can be influenced in relation to a regulation of the reaction temperature in the cells 11. The situation is as follows: As a result of the controlling of the valve 22 by means of the pressure regulator 4 a constant ratio of reservoir pressure $p_A$ to the pressure at the outlet of the valve 22 is set (here 1:1, equal pressure). The monitoring unit 14a receives, via a connection line 140a, a temperature signal from the battery 10, which represents an item of information on the reaction temperature. As a result of this information the speed of rotation of the blower 16 is regulated via the connection line 142. With a change of the forwarding power the pressure in the cells 11 also varies; accordingly more or less of the educts A and B is sucked in (with the state of the proportional action valve 6 remaining unchanged). The mass flow of the educt B should however remain constant in order that no variation of the electrochemical reaction results. This is achieved with the mass flow sensor 5 and a regulator 50, which are arranged between the outlet e of the device 20 and the inlet 13b of the battery 10. The regulator 50 acts on the proportional action valve 6 via a signal connection 65 for the purpose of keeping the amount delivered constant.

In the block circuit diagram of a second exemplary embodiment in FIG. 5 the monitoring unit 14a and the automat firing unit 14b are no longer illustrated, with the connections 140a and 140b however still being indicated. This also holds for the two following exemplary embodiments of FIGS. 6 and 7.

In the second example the pressure at the pressure regulator connection d is not directly varied by means of the mass flow sensor 5 and its regulator 50, but rather a pressure variation takes place indirectly via the connection a. An auxiliary ventilator 7, which produces a pressure difference with respect to the reservoir 1' (ambient pressure), is connected up to this connection a. The pressure difference is controlled by the regulator 50 and via the signal line 75 and is indeed controlled in such a manner that the through-flow of the gas flow 2 at the measurement point of the sensor 5 remains constant.

In the third example, FIG. 6, the pressure regulator 4 is connected up to the exhaust gas flow 3 at two locations 31 and 32, with an aperture diaphragm 30 or another means which is suitable for producing a pressure difference which is dependent on the mass flow being arranged between the two connection points 31 and 32 of the pressure regulator 4. The side connection c is closed. A valve 8, by means of which the gas pressure difference which acts on the pressure regulator 4 can be varied, is connected in parallel to the connection points 31 and 32. The valve 8 can be controlled with the regulator 50 of the mass flow sensor 5 and via a signal line 85 in such a manner that the gas flow 2 remains constant. Only slight gas flows are allowed to pass in the valve 8, so that the use of a micro-proportional action valve is advantageous. A customary valve can however also be used if the latter is operated in a cyclic mode. The inertia of the pressure regulator membrane 40 prevents an oscillation.

In the fourth example, FIG. 7, the opening side of the pressure regulator 4, connection a, is connected up to the exhaust gas flow 3, namely to a connection point 31, at which an increased pressure is present thanks to an aperture diaphragm 33 which is arranged downstream. As in the first example, the closing side of the pressure regulator 4 is connected up to the outlet of the valve 22 (connection of c to d). The pressure at the connection points 31 must be so great that a pressure difference with respect to the connection d results. A let off valve 9 by means of which the pressure difference which acts on the pressure regulator can be varied by means of the mass flow regulator 50 (signal line 95) in a manner which is analogous to that in the other examples is arranged between the connection point 31 to the exhaust gas flow 3 and the pressure regulator 4.

An example of the method in accordance with the invention in which the first educt flow 1 is acted on instead of the second one by a setting member 19 is illustrated in FIG. 8. The setting member 19 can be a valve, a regulation flap or a ventilator. The first educt flow 1 is conducted in two parts 1*a* and 1*b* upstream of the battery inlet. The one part 1*a* of the first educt flow 1 will be designated in the following as minimum air flow 1*a* for short, the other part as cooling air flow 1*b*. As a result of the device 20, which contains the pressure regulator 4, the minimum air flow 1*a* is supplied to the battery inlet 13*a* in a constant ratio by quantity to the second educt flow 2. The cooling air flow 1*b* of the first educt flow 1 is controlled for the purpose of regulating the reaction temperature. The named ratio by quantity is held constant by means of the pressure regulator 4 and indeed in such a manner that the air index $\lambda$ is greater than one for every cooling air flow 1*b*. An element 17 (for example a Venturi nozzle, aperture diaphragm, "linear flow element") which produces a guide pressure is arranged in the minimum air flow 1*a*. The element 17 is connected to the pressure regulator 4 so that the guide pressure can influence the second educt flow 2 via the connection a. The cooling air flow 1*b* can be measured by a mass flow sensor 18 and a corresponding signal transmitted to the control device 14*c*. A further signal for the control device 14*c* is generated by the mass flow sensor 5 in the second educt flow 2. The two educt flows 1 and 2 can be set using regulators, namely direct regulators or cascade regulators, which are components of the control device 14*c*. The mass flow sensor 18 is required only for the cascade regulator concept. The mass flow sensor 5 can alternatively also be located in the minimum air flow 1*a*. The second educt flow 2 can be calculated as a result of the constant $\lambda$ ratio.

In the regulation conception with direct regulators the setting member 19 is controlled by a first regulator as a result of the monitoring of the reaction temperature. The blower 16 is controlled by a second regulator, which compares a desired value for the second educt flow 2 with an actual value which is measured by the mass flow sensor 5.

In the cascade regulator concept a desired value for the cooling air 1*b*, is determined as a result of the monitoring of the reaction temperature with a first regulator, which is compared in a second regulator with an actual value which is measured by the mass flow sensor 18 with a first output signal being generated. A second output signal is generated with a third regulator, which compares a desired value for the second educt flow 2 with an actual value which is measured by the mass flow sensor 5. Control parameters for the blower 16 and the setting member 19 are determined from the two output signals, and these plant components are correspondingly controlled. For the controlling of the blower 16 the two output signals are added; for the controlling of the setting member 19 a quotient of the output signals is formed.

What is claimed is:

1. Method for the operation of a fuel cell battery (10) comprising a control system (14), through which the electrochemical reactions in cells (11) of the battery are influenced, wherein gaseous flows (1, 2) of two educts (A, B) are fed into the battery in a controlled manner in a conditionally predetermined ratio of quantities and are conducted separately through the cells, with the first educt (A) containing oxidizing components, the second educt (B) containing reducing components and the first educt being in particular ambient air, wherein the educt flows (1, 2) are united after passage through the cells and are further treated by means of an afterburning process and with the production of a flow (3) of exhaust gas (C), so that at the conditionally predetermined ratio of quantities the reducing components are completely oxidized, wherein the first educt flow, in particular the air flow, is variable through the control system to a limited extent and is used for a regulation of the reaction temperature, and wherein—simultaneously to the regulation of the reaction temperature—the second educt flow is held constant, namely by means of a second regulation (5, 6; 18, 19) which acts on one of the educt flows upstream of the battery inlet (13*a*, 13*b*).

2. Method in accordance with claim 1, characterized in that the educt flows (1, 2) are driven by sucking away of the exhaust gas (C) by means of a blower (16) of which the speed of rotation is controlled; and in that the reaction temperature is regulated by means of changes of the speed of rotation of the blower.

3. Method in accordance with claim 1, characterized in that the second educt flow (2) is influenced upstream of the battery inlet by a valve (22) and a further member (6; 7; 8; 9), with the valve being controlled by a pressure regulator (4) which is connected up to a supply line (c) of the second educt (B) and/or to an exhaust gas flow (3), and the further member being controlled by means of a mass flow sensor (5) and of a regulator (50).

4. Method in accordance with claim 3, characterized in that the pressure regulator (4) is connected to a reservoir (1') of the first educt (A), in particular to ambient air, and to the second educt flow (2) at the valve outlet (c), so that as a result of the controlling of the valve (22) a constant ratio of reservoir pressure ($P_A$) to the pressure ($P_B$) at the valve outlet sets in; and in that a proportional action valve (6) which is arranged downstream of the valve (22) of the pressure regulator is used as the further member.

5. Method in accordance with claim 3, characterized in that the pressure regulator (4) is connected to a reservoir (1') of the first educt (A) and to the second educt flow (2) at the valve outlet (c); and in that an auxiliary ventilator (7) which is arranged between the pressure regulator and the reservoir is used as the further member.

6. Method in accordance with claim 3, characterized in that the pressure regulator (4, a, d) is connected to the exhaust gas flow (3) at two points (31, 32); in that an aperture diaphragm (30) or another means for producing a pressure difference which is dependent on the mass flow is arranged between the two connection points (a, d or 31, 32) of the pressure regulator; and in that a valve (8), which is connected in parallel to the pressure regulator and by means of which the pressure difference which acts on the pressure regulator can be varied, is used as the further member.

7. Method in accordance with claim 3, characterized in that the opening side (a) of the pressure regulator (4, a, d) is connected to the exhaust gas flow (3, 31) and the closing side (d) is connected to the output (c) of the regulatable valve of the second educt (B), with a pressure difference being produced between the two connection points (a, d) by suitable means, in particular aperture diaphragms (33); and in that a let off valve (9) by means of which the gas pressure difference which acts on the pressure regulator can be varied is used between the connection point (31) of the exhaust gas flow (3) and the pressure regulator (4, a) as the further member.

8. Method in accordance with claim 1, characterized in that means for carrying out the second regulation can be influenced as a result of a change of quality of the second educt (B); in that the quality of the second educt can be characterized by a parameter; in that a sensor for measuring this characteristic parameter is arranged in the second educt flow (2) or in the exhaust gas flow; and in that a variation of the characteristic parameter is used to influence of the second regulation.

9. Method in accordance with claim 1, characterized in that first educt flow (1) is supplied in two parts (1a, 1b) upstream of the battery inlet (13a), the one part (1a) of the first educt flow—in particular a minimum air flow—being supplied in a constant ratio by quatity with respect to the second educt flow (2) and the other part (1b) of the first educt flow being controlled for the purpose of regulating the reaction temperature, with the named ratio of quantities being held constant by means of a pressure regulator (4) and indeed in such a manner that the air index $\lambda$ is always greater than one.

10. Plant comprising a fuel cell battery (10) and a control system (14) in accordance with any one of the methods of the claim 1, characterized in that a pressure regulator (4) and supply lines for the educts (A, B) are parts of a pneumatic or electro-pneumatic combination; in that the pressure regulator comprises a container with two chambers (41, 42) which are subdivided by a membrane (40), the membrane is connected to a valve (22) to be controlled and the pressure regulator can be a balanced pressure regulator or a pressure ratio regulator.

* * * * *